Aug. 26, 1947.  J. R. SNYDER  2,426,471
QUICK DISCONNECT COUPLING
Filed Jan. 17, 1946  4 Sheets-Sheet 1
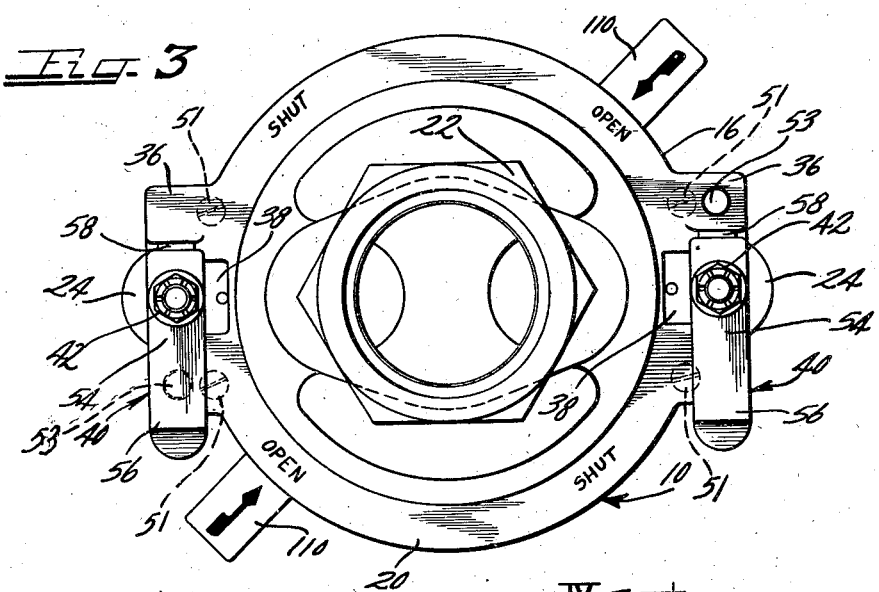
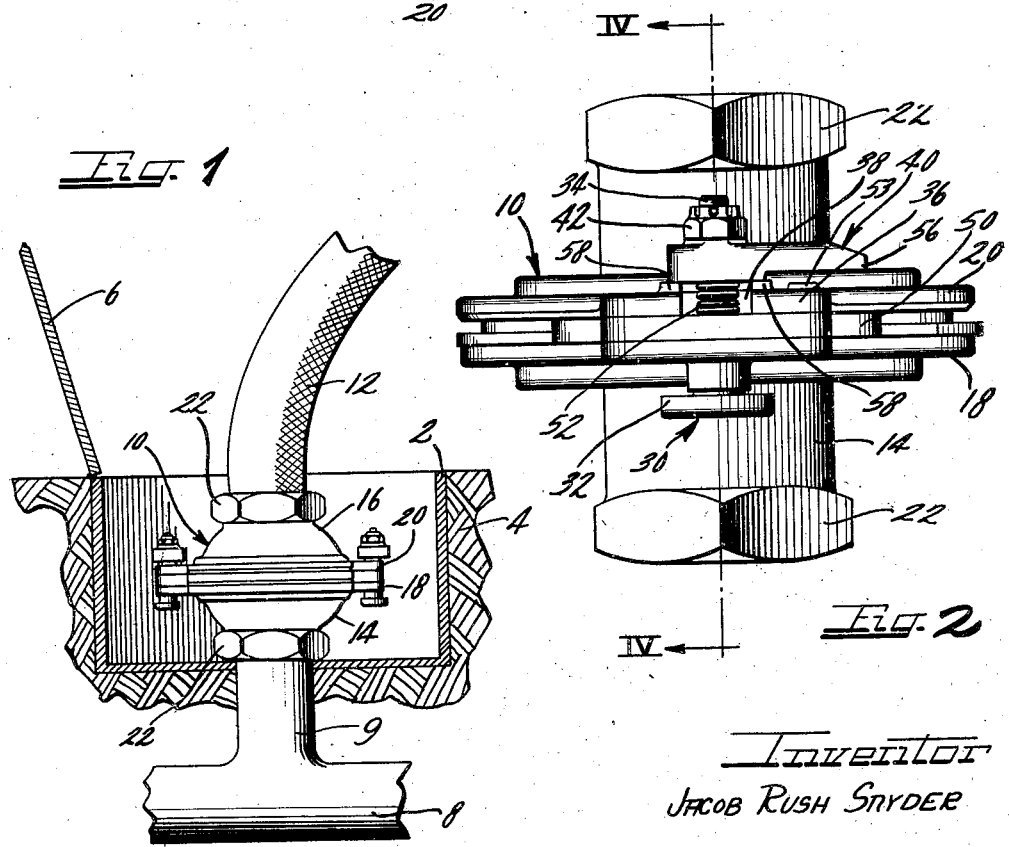
Inventor
JACOB RUSH SNYDER
by The Firm of Charles W. Hill  Attys.

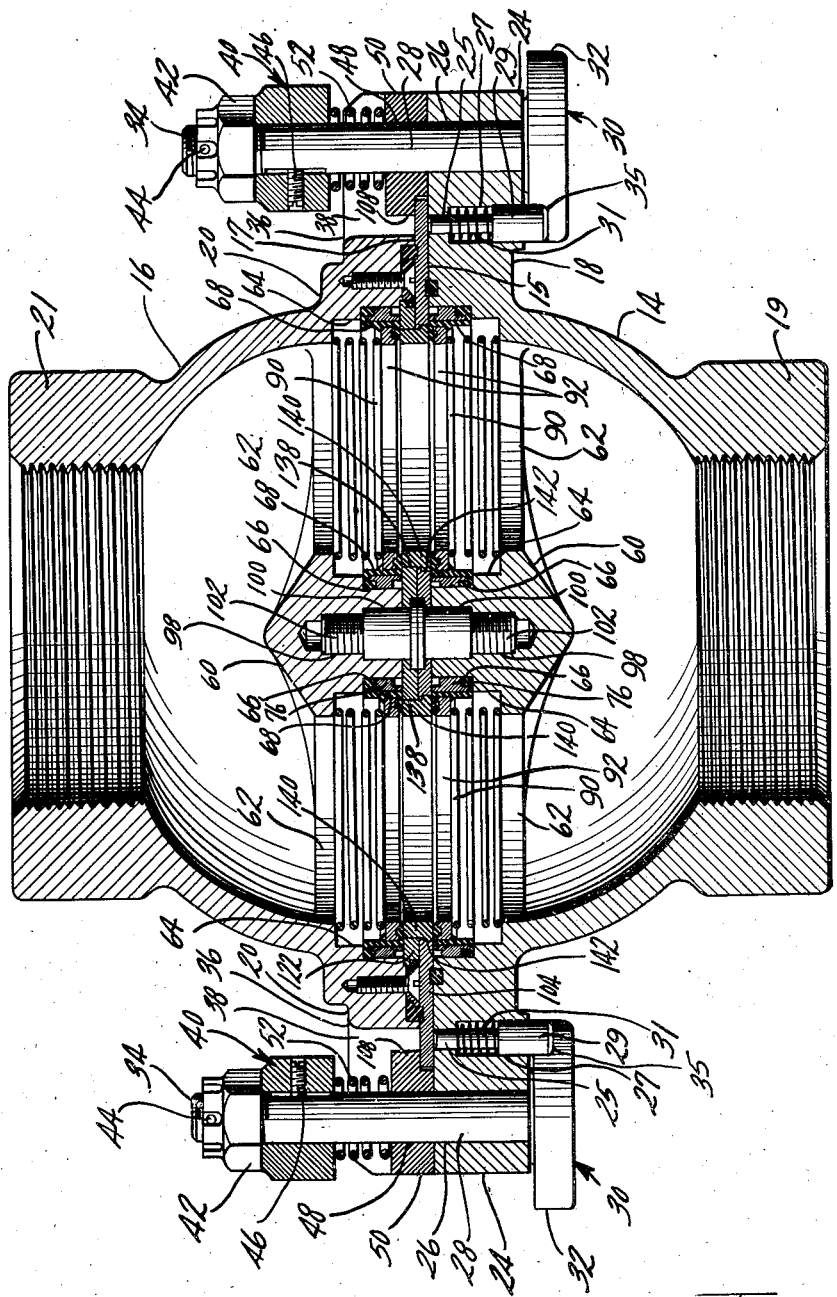

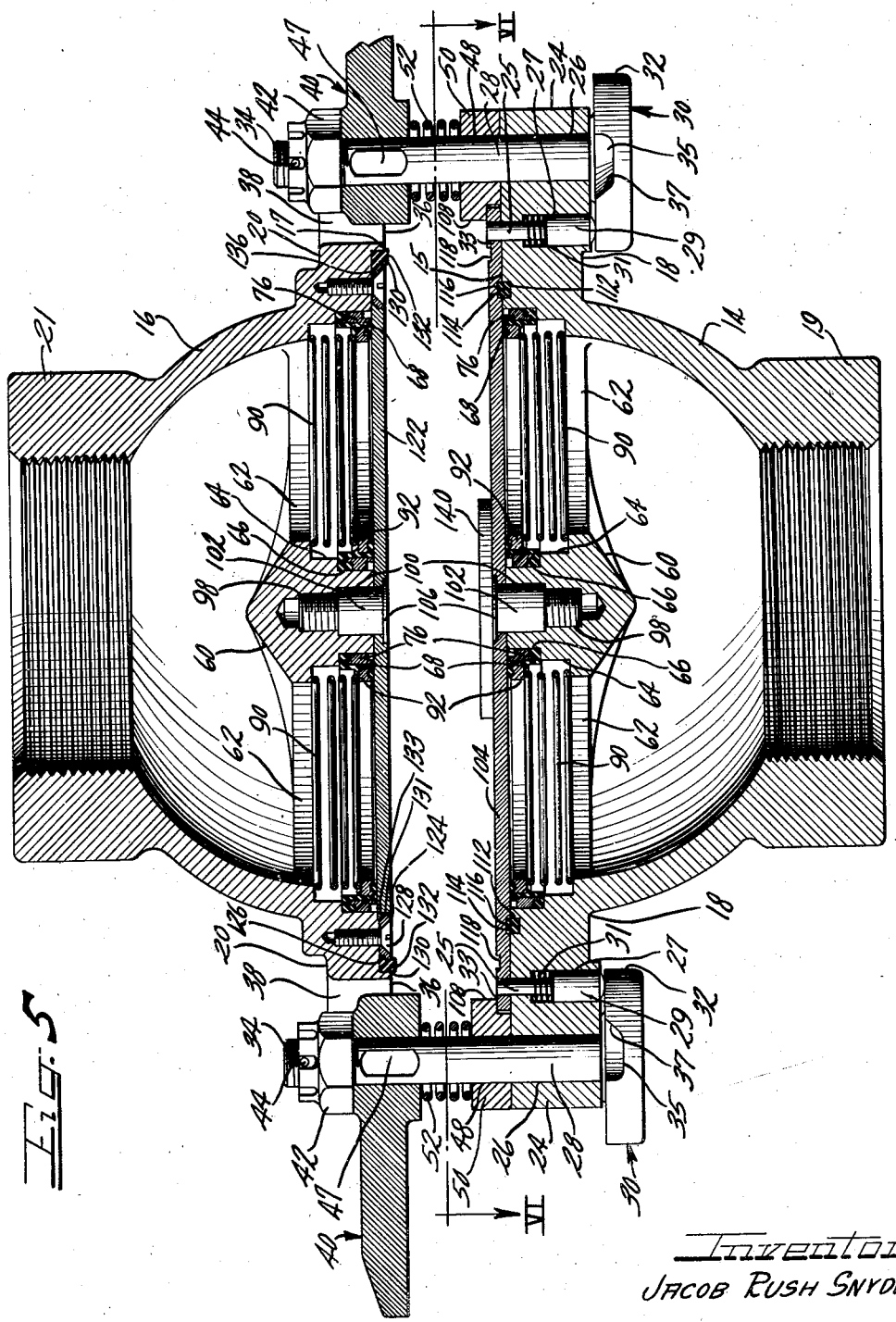

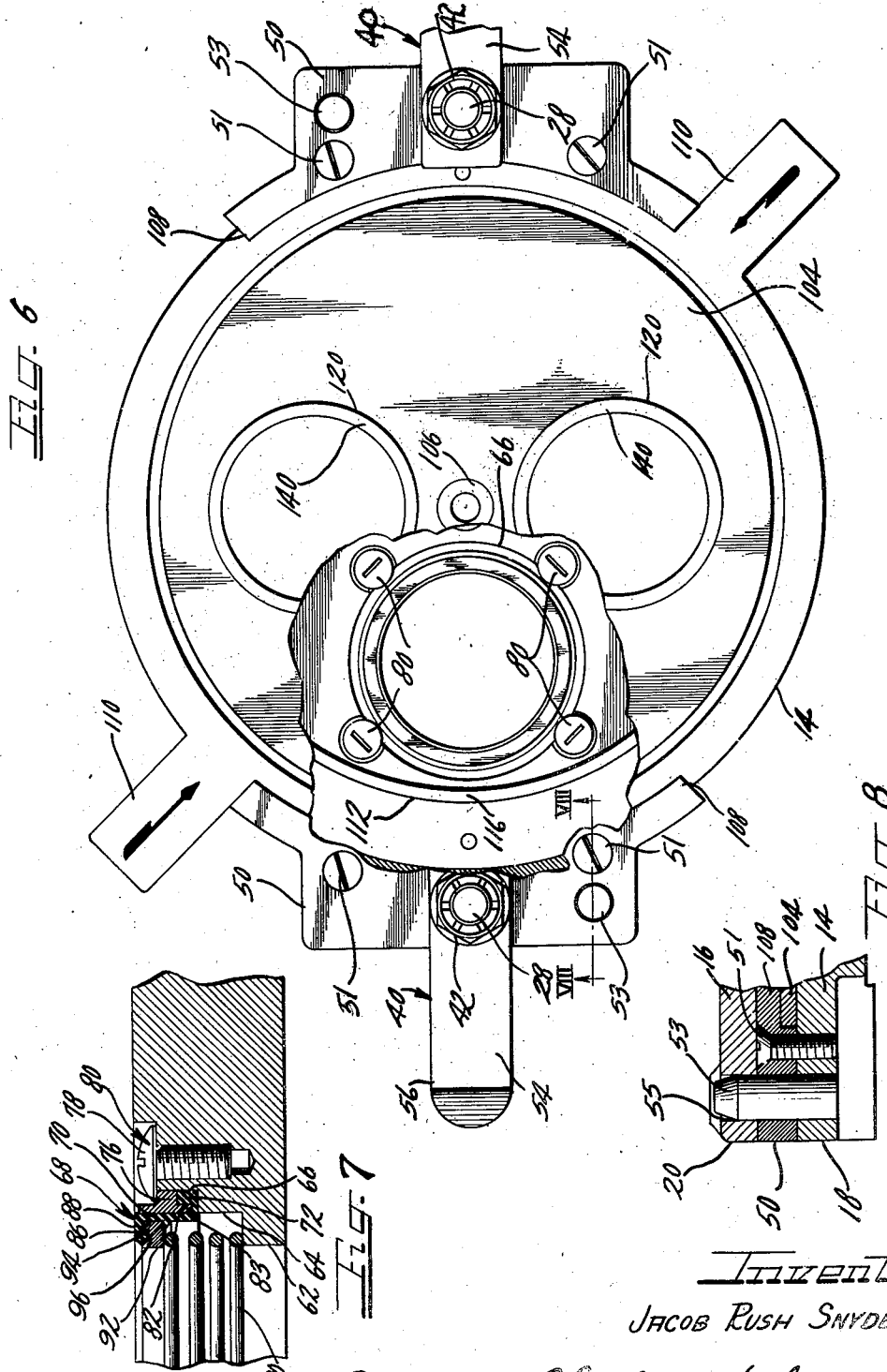

Patented Aug. 26, 1947

2,426,471

UNITED STATES PATENT OFFICE 2,426,471

QUICK DISCONNECT COUPLING

Jacob Rush Snyder, Cleveland, Ohio, assignor to Thompson Products Inc., Cleveland, Ohio, a corporation of Ohio Application January 17, 1946, Serial No. 641,791

21 Claims. (Cl. 284—5)

1

This invention relates to a fluid coupling and particularly to a coupling of the class known as quick disconnect couplings wherein each half of the coupling is self-sealing when the respective half parts are in uncoupled position and are conveniently manually coupled to produce a continuous fluid passage through the coupling.

Quick disconnect couplings of various types have heretofore been known in the art. While such known valve structures are suitable for connecting conduits of relatively small diameter, for example, on the order of less than one inch, considerable difficulty has been encountered in applications requiring the coupling of large conduits on the order of one inch or greater due to excessive fluid loss during coupling operations. The reason for this is quite apparent. Most known valve structures utilize a cylindrical valve member rotatable about the cylinder axis and having a transverse hole for fluid passage therethrough. The hole through the rotatable valve member must be at least equal in diameter to the diameter of the respective conduits which the coupling interconnects in order to avoid unnecessary restriction of fluid flow through the coupling. Accordingly, to provide a large diameter passage through the coupling an excessively large cylindrical valve member had to be provided, thus making the resulting coupling large and cumbersome. Furthermore, in such known structures, the fluid loss during the uncoupling operation is substantially measured by the volume of the passage through the rotary valve member. It can be readily seen that in couplings designed for large conduits, such fluid loss becomes quite appreciable. For example, a coupling for a three-inch conduit utilizing a cylindrical rotatable valve member would involve a fluid loss on the order of 35 cubic inches during each uncoupling operation. While such amount of fluid may not be appreciable as compared to the flow through the coupling, still, when inflammable fluids are being transmitted, the loss of such amount creates a severe fire hazard.

Another marked disadvantage of known quick disconnect coupling constructions when such constructions are applied to large conduits lies in the fact that an excessive force is required to accomplish coupling or uncoupling operations. This is due to a variety of factors chief among which is the increased pressures generally accompanying the use of a larger diameter conduit, secondly, the increased fluid sealing surface area which of course must be in frictional engagement with the rotatable valve member at all times, and lastly,

2 the large area of the valve aperture defining walls which must be rotated across the fluid flow.

According to this invention, complementary casing parts are provided which are adapted to be secured to the end of tubes, pipes or other similar conduits through which unrestricted fluid flow communication is desired in the coupled position of the casings. Each casing is hollow and has a generally planar end which lie in abutting relationship when the casings are coupled together. A web portion extends across the hollow interior of each casing adjacent the planar face of each casing. A plurality of ports are provided in such web in eccentric relation with respect to the longitudinal axis of the casing. A disk-like valve member is mounted on each casing adjacent its planar end for rotation about the longitudinal casing axis and overlying the ports provided in the web portion. Each valve member is provided with a corresponding number of eccentrically located apertures which may be successively aligned or misaligned with the ports, depending upon the rotative position of the valve member relative to the casing. The two casings are coupled together by a plurality of quick-acting clamps and in their coupled position the two valve members lie in abutting relationship. An annular bushing is provided in the aperture of one of the valve members and these bushings project outwardly from the valve member to engage in the aperture of the other valve member, thus securing the two valve members for co-rotation in the coupled position of the casing.

An integrally formed arm on one of the valve members projects to the exterior of its casing and provides a convenient handle for manual rotation of the two valve members in the coupled position of the casings. Thus, after the two casings have been coupled together, the two valve members may be rotated as a unit between a closed position, in which the apertures in the valves are misaligned with the ports in the respective casing web, and an open position where the valve apertures align with the ports. By this construction very little fluid is disposed in the apertures of the disk-like valve members, and accordingly, no fluid is lost in the coupling operation and only a very small amount in the uncoupling operation.

To uncouple a coupling constructed in accordance with this invention, the valve members are manually rotated back to closing position relative to the ports in the casing. Another feature of this invention relates to the provision of an interlock, comprising spring-pressed detents, which cooperate respectively between one of the valve members and each of the quick-acting clamp members. Such detent is arranged so as to prevent uncoupling movement of the clamp so long as the valve members are in an open position. Upon return of the valve members to their closed position the detent is aligned with a hole in one of the valve members and can be cammed out of the path of the quick-acting clamp member. Of course release of the quick-acting clamp then permits the separation of the two casings. The only fluid loss during such separation is the relatively small amount contained within the apertures of the disk-like valve members. Furthermore, in the uncoupled relation of the casings the valve member having the operating arm is held in its closed position by the interlocking detent and thus inadvertent or accidental operation of the valve member is prevented. The valve member on the other casing cannot be accidentally operated while the casing is uncoupled for this member does not have any operating handle formed on it, and accordingly cannot be conveniently rotated to an open position.

Another feature of this invention lies in the provision of an improved seal which prevents fluid leakage at the joint between each port in the casing web and the adjacent planar surface of the movable valve member. In accordance with this invention an annular sealing band of flexible material is inserted in the port and the inserted end of such band is secured to the walls of the port by a securing ring. A shoulder is provided on the end of the band member adjacent the rotatable planar valve surface and a spring urges the adjacent end of the annular band into sealing engagement with the planar valve surface. With this arrangement, the flexing of the resilient material of the band seal permits the adjacent end of the band to move axially under its spring bias into sealing engagement with the planar surface of the valve, thus accomplishing an extremely effective seal. At the same time, however, when the valve disk is disassembled from the casing the band seal does not immediately fly out, being restrained in its proper position within the port by the supporting ring.

A further feature of this invention is the disposition of the sealing ring between the rotatable valve members and the casing in such manner as to minimize the frictional resistance to rotation of the valve members relative to the casing, thus permitting manual operation of the valve members in the coupled position of the casings without appreciable effort.

A particularly important feature of this invention is the fact that operation of the valve requires so little effort that manual operation is possible even in valves for large size, high pressure conduits. This is due to the fact that the independent coupling of the casing members substantially neutralizes the fluid pressure forces on the rotary valve discs, and further, because the area of the aperture defining walls of the valve discs which cuts across the fluid flow is quite small.

Accordingly, it is an object of this invention to provide a quick disconnect fluid coupling device characterized by the simplicity of its construction, the ease and reliability of its operation, and a low fluid loss during uncoupling operation.

A general object of this invention is to provide cooperating quick disconnect coupling devices which automatically join two passageways in unrestricted fluid flow communication when coupled and automatically seal the ends of the two passageways when uncoupled.

Another object of this invention is to provide an improved quick disconnect fluid coupling embodying a disk-like valve member manually rotatable about the disk axis to control fluid flow through the coupling.

Another object of this invention is to provide a quick disconnect coupling particularly adapted for coupling large diameter fluid conduits in that loss of fluid during uncoupling is maintained at a minimum and the effort required for coupling and uncoupling operations may be conveniently exerted manually and without resort to special tools.

A further object of this invention is to provide an improved quick disconnect fluid coupling comprising two complementary casings, each having a rotatable disk-like valve element therein, and coupled together by clamping elements independent of the valve elements but interlocked with the valve elements to prevent movement of the valve elements when the casings are uncoupled or to prevent uncoupling of the casings except when the valve elements are in a desired position.

A specific object of this invention is to provide an improved quick disconnect fluid coupling device comprising a pair of complementary casings detachably secured in coaxial relation by a quick-acting clamp, wherein a plurality of eccentrically disposed ports are provided in each casing which are aligned in the coupled position of the casings and rotatable disk-like valve elements in each casing are disposed in abutting relation when the casings are coupled for co-rotation between an open and a sealing position relative to the ports.

A particular object of this invention is to provide an improved fluid seal construction for sealing a juncture of a conduit and an intersecting planar surface which is movable relative to the conduit in its own plane.

Other important features and objects of the invention will be apparent from the following detailed description of the annexed sheets of drawings which, by way of preferred example only, illustrate an embodiment of the present invention.

On the drawings:

Figure 1 is a sectional view of a fluid distributing station showing a supply conduit and a distributing conduit joined to the supply conduit by a quick disconnect coupling embodying this invention;

Figure 2 is an enlarged scale, side elevational view of the quick disconnect coupling shown in Figure 1;

Figure 3 is a top elevational view of the coupling of Figure 2 showing the valve operating arm in its open position;

Figure 4 is an enlarged scale sectional view taken along the plane IV—IV of Figure 2;

Figure 5 is a view similar to Figure 4 but showing the complementary casing parts of the coupling in uncoupled relationship;

Figure 6 is an elevational view, partly in section, of the lower casing part of Figure 5;

Figure 7 is a partial sectional view of the fluid seal construction in accordance with this invention for use between a conduit and an intersecting planar surface.

Figure 8 is a partial sectional view taken along the plane VIII—VIII of Figure 6.

While not limited thereto, this invention finds particular utility in its application to fuel distributing stations provided in a plurality of locations around an air field, which permit a plane to be refueled at practically any spot on the air field. The fluid coupling between the supply hose for the plane being refueled and the fuel distributing station obviously should be of the quick disconnect type, readily operable by hand, and involving a minimum loss of the combustible fluid during coupling and uncoupling operations to eliminate the attendant fire hazard.

Referring to Figure 1 of the drawings, there is shown diagrammatically a fuel supply station for an air field comprising a box-like receptacle 2, which is conveniently set into a suitable recess in the top surface of a concrete runway 4, having a hinged lid 6 which normally covers the top of the receptacle 2 when not in use. An underground main fuel supply line 8 supplies fluid through a feeder pipe 9 to the interior of the receptacle 2. A quick disconnect valve 10 embodying this invention is utilized to connect the feeder pipe 9 with a hose 12 for supplying fuel to an airplane (not shown). The valve 10 embodies two complementary casings 14 and 16 which are respectively secured to the feeder pipe 9 and the hose 12. In this particular application, the casing 14 constitutes what will be referred to as the fixed casing, while the casing 16 constitutes the movable casing. It will, however, be obvious that the terms "fixed" and "movable" are merely relative, and in other applications the fixed casing could readily be movable while the movable casing constitutes the fixed casing, or both of such casings might be movable relative to each other.

Each of the casings 14 and 16 comprise hollow members having cylindrical interiorly threaded end portions 19 and 21 respectively joined to pipe 9 and hose 12, and the other end portions carrying integral circular flanges 18 and 20, such flanges having, respectively, planar end surfaces 15 and 17, which are perpendicular to the longitudinal axis of the casings. In the coupled position of the casings, the planar end surfaces 15 and 17 of the flanges 18 and 20 lie in opposed relationship. On the ends 19 and 21 of the casings, suitable wrench-receiving flat surfaces 22 are provided to facilitate the threaded assembly of casings 14 and 16 respectively on the feeder pipe 9 and the hose 12.

To provide a mounting for a clamp to secure the casings 14 and 16 in coupled relation, the fixed casing 14 is provided with a plurality of projecting lugs 24 integrally formed with the flange 18 and equally spaced about the periphery of such flange. A hole 26 is provided in each of the lugs 24 parallel to the axis of the casing 14 and receives in rotatable relation therein the shank 28 of a clamp mounting bolt 30 having an enlarged head portion 32 engaging the underside of the lug 24 and a threaded portion 34 at its opposite end. Complementary lugs 36 are formed on the flange 20 of the movable casing 16 and each of such lugs 36 provided with an outwardly opening central recess 38 which in the coupled position of the casings freely surrounds the threaded end 34 of the clamp mounting bolt 30. A clamp member 40 is slipped over the threaded end 34 of each of the clamp mounting bolts 30 and is secured thereon by a castellated nut 42, the position of which may be adjusted on the thread 34 by a cotter pin 44. A set screw 46 is provided in each of the clamps 40 cooperating with a flat 47 on bolt 30 to secure such clamps to the clamp mounting bolt 30 for co-rotation. The clamp mounting bolt 30 also projects through a hole 48 in a retainer segment 50 which will be described in more detail later. Each of the retainer segments 50 lies on the top of the flange 18 on the fixed casing and is secured thereon by screws 51. A spring 52 is provided which surrounds the clamp mounting bolt 30 and operates between the clamp 40 and the top surface of the retainer segment 50.

Each of the clamp elements 40 has a generally rectangular body portion 54, the narrow dimension of which is small enough to permit the clamp 40 to be freely insertable in the recess 38 of the lugs 36 of the movable casing 16 when disposed within narrow dimensions parallel to the width of such recess. The length of the body portion 54 of the clamp 40 is sufficient, however, to permit such body portion 54 to overhang the side walls of the recess 38 to achieve a clamping relation with the movable casing portion 16. To facilitate rotation of the clamp 40 between its clamping and unclamping position, an extending finger piece 56 is integrally formed on the body portion 54.

Thus, to couple the movable casing 16 to the fixed casing 14, the movable casing 16 is coaxially aligned with the fixed casing 14 by the cooperation of dowel pins 53 pressed into flange 18 with holes 55 in flange 20 (Fig. 8) and moved axially toward the fixed casing. The body portions 54 of the clamps 40 are disposed as shown in Fig. 6 with their narrow dimensions parallel to the width of the recesses 38 and thus the clamps 40 freely enter the recesses 38. When the movable casing 16 has been moved into abutting relationship with the fixed casing 14, the clamps 40 are then rotated by the finger pieces 56 to dispose the long dimension of their body portions 54 across the recess 38 in the lug 36. It will be understood that the castellated nuts 42 are adjusted on the threaded portion 34 on the clamp mounting bolt 30 so that the clamp 40 is suitably positioned to achieve a tight coupling engagement between the movable casing 16 and the fixed casing 14. If desired, a pair of spaced upstanding locking lugs 58 may be provided on each side of each recess 38 to receive the bottom surface of the clamp 40 in locking relation. To increase the force of the clamping action the leading edges of such upstanding locking lugs may be suitably tapered (not shown). It should be noted that in addition to securing the retainer segment 50 the springs 52 also maintain the clamp 40 in continued contact with the castellated nut 42, thus expediting the manipulation of the clamp 40.

A web 60 is integrally formed in each of the casings 14 and 16, extending across the hollow interior thereof immediately adjacent the planar end of the casing. A plurality of cylindrical ports 62 are formed in each web 60, such ports being eccentrically located with respect to the longitudinal axis of the casings and disposed in similar locations in both the fixed casing 14 and the movable casing 16. To accommodate an improved seal construction in accordance with this invention, each port 62 is provided with a primary counterbore 64, and the primary counterbore is again counterbored to form a secondary counterbore 66. Within the secondary counterbore 66 of each of the ports 62 a sealing member 68 (Fig. 7) is inserted. The sealing member 68 comprises an annular structure formed from resilient rubber or rubber-like fluid-sealing material and has a band-like body portion 70 which is of substantially smaller diameter than the diameter of the secondary counterbore 66 in which the seal 68 is inserted. An integrally formed outwardly extending flange portion 72 is provided on the inserted end of the body portion 70 of the seal 68. The periphery of the flange portion engages the wall of the secondary counterbore 66 and thus defines an annular space between the body portion 70 and the wall of the secondary counterbore 66. A ring-like retainer 76 is snugly mounted in the annular space to secure the seal 68 within the secondary counterbore 66. The retainer 76 is in turn secured within the secondary counterbore 66 by the over-hanging head 78 of a plurality of screws 80 which are provided in the web 60 in spaced relationship about each of the ports 62 (Fig. 6).

To further provide a more effective sealing action, the flange 72 of sealing member 68 is provided with an annular recess 82 (Fig. 7) and the retainer ring 76 is formed with a T-shaped cross section, the head of the T lying adjacent the body portion 70 of the seal 68 and one end 83 of the head extending into the annular recess 82. Thus any fluid attempting to leak around the seal 68 into the secondary counterbore 66 will have to follow a variable direction path, thereby obtaining what is known in the art as a cross-sealing of the fluid. It should be further noted that while the seal 68 is securely retained within the secondary counterbore 66, only the inserted end of such seal is fixed relative to the counterbore. The other end of the seal, or the forward end, is thus free to move axially relative to the port 62 by stressing of the resilient material of the seal lying between the forward end and the secured inserted end.

On the forward end of the body portion 70 of the seal member 68, a radially inturned flange 86 is provided, the front wall surface 88 of which engages a valve member in sealing relation as will be later described. To urge the front wall surface 88 axially into engagement with the cooperating valve surface, a spring 90 is provided which operates between the base of the primary counterbore 64 and the rear surface of the radial flange 86 on the sealing member. To facilitate the engagement between the spring 90 and such flange, a spring seat 92 is provided comprising an annular ring-like member which is inserted between the spring and the rear surface of the flange 86. To prevent undue outward deflection of the flange 86 when the associated valve member is disassembled from the casing, the spring seat 92 is provided with an annular recess 94 on its front face which snugly receives therein a rib 96 formed on the rear face of the flange 86 of the sealing member.

In the center of each of the web portions 60 of both the fixed casing 14 and the movable casing 16, there is provided an axial threaded hole 98 having an enlarged counterbored portion 100. Such hole receives correspondingly shaped bearing pin members 102 which, as will be described, support rotatable disk-like valve members on the fixed casing 14 and the movable casing 16 respectively.

The disk-like valve member 104 which is rotatably mounted on bearing pin 102 in the fixed casing 14 will hereafter be referred to as the male valve member. The male valve member 104 comprises a disk of substantially uniform thickness having a suitable hole in the center thereof to receive bearing pin 102 and counterbored to accommodate a thin flange-like head 106 on the bearing pin 102 which secures the valve member 104 to the fixed casing 14. It should be noted that the head of the bearing pin 102 is substantially flush with the outer surface of the valve member 104. The valve member 104 is further supported at its periphery by overhanging arcuate ledges 108 provided on the inner surface of each of the retainer segments 50 (Fig. 6). In the particular construction shown in the drawings, each retainer segment 50 comprises an arcuate member having an arcuate extent of approximately 75°, but it should be understood that the extent of the segment 50 is proportioned to the desired extent of the rotary movement of the valve member 104 in a manner that will be later brought out.

At diametrically oppositely spaced points on its periphery, which lie intermediate the segments 50, the valve member 104 is provided with integral radially projecting operating arms 110, which extend sufficiently far out from the fixed casing 14 to enable them to be conveniently grasped by the finger for rotating the male valve member 104. It is therefore apparent that the retainer segments 50 limit the extent of rotational movement of the male valve member 104 by the engagement of the operating arms 110 therewith at each end of their path of movement. Accordingly, the arcuate extent of the retainer segment 50 should be proportionate relative to the desired amount of rotational movement required for operation of the male valve member 104.

To seal the joint between the male valve member 104 and the planar end surface 15 of the fixed casing 14, an annular recess 112 is provided in the planar end surface 15 and a similar recess 114 is provided in opposed relationship in the adjacent surface of the male valve member 104. A ring seal 116 is then assembled in the annular space defined by the cooperating recesses 112 and 114. Here, again, a cross sealing of leakage fluid is obtained. On the outwardly facing surface of the male valve member 104, an annular recess 118 (Fig. 5) is provided which, when the movable casing 16 is coupled to the fixed casing 14, snugly receives therein a projecting ring-like portion 132 of an annular sealing member 130 which is mounted in the planar end surface 17 of the movable casing 16, as will be later described in detail.

The male valve 104 is provided with a plurality of eccentrically located apertures 120 which coincide in number, shape and location to the ports 62 in the fixed casing 14. The male valve member 104 is otherwise substantially imperforate, so that unimpeded fluid flow through the fixed casing 14 is accomplished only when the male valve member 104 is rotated by operating arms 110 to a position in which the apertures 120 are respectively aligned with the ports 62. Such rotative position of the male valve member 104 may be conveniently made to coincide with engagement of the operating arm 110 with one end of the retainer segment 50 as illustrated in Fig. 4. Conversely, all fluid flow through the fixed casing 14 is interrupted when the male valve member 104 is rotated to a position where each of the apertures 120 are completely misaligned with the ports 62. This fully closed position may conveniently be made to correspond with the position of engagement of the operating arm 110 with the other end of the retainer segment 50 as illustrated in Figs. 5 and 6. Obviously, intermediate positions of the valve member 104 will produce a regulating effect on the flow of fluid through the casing 14. Accordingly, any predetermined amount of fluid flow from zero up to the maximum permitted by the feeder pipe 9 can be obtained very conveniently by merely adjusting the rotative position of the operating arm 110.

It should be noted that in any rotative position of the male valve member 104, the sealing member 68 is resiliently maintained in its sealing relationship with the adjacent planar surface of valve member 104. The front wall surface 88 of such seal is continuously urged axially outwardly into engagement with the adjacent planar surface of the valve member 104, and, due to the flexibility of the relatively long body portion 70 of sealing member 68, provides a yielding telescopic sealing arrangement that will automatically compensate for manufacturing variables, wear, shrinkage, and swell.

The rotary valve member 122 provided on the movable casing 16 will hereafter be referred to as the female valve member. The female valve member 122 comprises a disk-like member having a counterbored hole at its center permitting its rotatable mounting on the respective bearing pin 102 in the same manner as described in connection with the male valve member 104. The periphery of the female valve member 122 is rotatably supported by an annular ring 124 (Fig. 5) which is secured in an annular recess 126 provided in the planar end surface 17 of the movable casing 16. The ring 124 is secured to the casing 16 by a plurality of peripherally spaced screws 128. An overhanging ledge 131 on the ring 124 cooperates with a projecting flange 133 on the female valve member 122 to provide rotational support for the valve member.

To prevent fluid leakage from the ring 124 and out of the casing 16, an annular seal 130 is compressed between the side wall 134 of the recess 126 in the planar end face 17 of the casing and the outer peripheral wall 136 of the support ring 124. To increase the effectiveness of the seal 130, the cooperating surfaces of the seal and the outer peripheral wall 136 are provided with interfitting annular flanges to provide a cross sealing effect. As was previously mentioned, a depending rib 132 is integrally formed on the annular seal 130 and projects outwardly past the outer surface of the female valve member 122, and, in the coupled position of the casings 14 and 16, the rib 132 snugly engages in the annular groove 118 provided in the outer surface of the male valve member 104, thereby eliminating fluid leakage between the valve discs.

The female valve member 122 is provided with a plurality of apertures 138 therein corresponding in number, shape and location to the ports 62 of the movable casing 16. The flow of fluid through the movable casing 16 is determined by the rotative position of the female valve member 122 in the same manner as the action of the male valve member 104 in the fixed casing 14. It will be noted, however, in the uncoupled position of the movable casing 16, that no means are provided for conveniently manually rotating the female valve member 122. Thus, insurance against accidental opening of this valve member when its casing is uncoupled is thereby obtained. Likewise the seals 68 provided at each of the ports 39 of the movable casing 16 cooperate with the adjacent planar surface of the female valve member 122 in the same manner as described in connection with the male valve member 104.

To achieve rotation of the female valve member 122 synchronously with the rotation of the male valve member 104 when the movable casing 16 is coupled to the fixed casing 14, a coupling bushing 140 is inserted in each of the apertures 120 in the male valve member 104. Each of the coupling bushings 140 is provided with a flanged head portion 142 which seats in a counterbore provided in each of the apertures 120. The coupling bushings 140 are thus resiliently secured in assembly in the male valve member 104 by the front wall surface 88 of the seal 68 under the bias of the spring 90. The front wall surfaces 88 of the seals 68 are disposed on each side of the joints between the coupling bushings 140 and the apertures 120, and thus serve to prevent fluid leakage through such joints.

The coupling bushings 140 project outwardly from the face of the male valve member 104 to a distance equivalent to the thickness of the female valve member 122, and the external diameter of the coupling bushings 140 is determined so that in the coupled position of the fixed casing 14 and the movable casing 16 the projecting part of the coupling bushing 140 will snugly seat in the apertures 138 in the female valve member 122 as shown in Fig. 4. Since the apertures 138 are eccentrically located with respect to the rotational axis of the female valve member 122, it will be apparent that the male and female valve members are secured together for co-rotation by coupling bushings 140.

From the foregoing description, it will be apparent that the described device functions not only as a quick disconnect coupling, but also as a fluid flow valve. When the movable casing 16 is uncoupled from the fixed casing 14 the disk-like valve members associated with each casing are normally in a closed position to prevent loss of fluid. Upon coupling of the casings together by operation of the clamp 40, the male and female valve members are secured together for co-rotation, and hence manual rotation of the operating arms 110 will simultaneously and synchronously rotate both the male and female valve members to open, closing or intermediate regulating position relative to the port 60 and thus control the flow of fluid through the coupled casings.

It is desired to point out that the independent clamping of the movable casing 16 to the fixed casing 14 absorbs the majority of all forces internally produced by the pressure of the fluid flowing through the coupling. Thus, in contrast to conventional construction, the rotational movement of the disk-like valve members is substantially unimpeded by pressure forces exerted by fluid flowing through the valve. It should be further noted that, during the uncoupling operation, the maximum amount of fluid that can possibly be lost in the operation is the amount that may be trapped within the volume of each of the apertures in the two rotatable disk-like valve members. Since the length dimension of these apertures is very small in comparison with the diameter of the supply conduit, in this case the feeder pipe 9, it is apparent that the fluid loss, even for large size couplings on the order of 10 to 12 inches diameter, will be exceedingly small and can be conveniently tolerated. Finally it should be noted that each of the seals provided in the described construction includes a variable direction leakage path, thereby securing the benefit of a cross sealing effect, and hence leakage through the seals is substantially eliminated in either the coupled or uncoupled relationship of the casings, or during the coupling or uncoupling operations.

In order to prevent the opening of the coupling device while the valve members are disposed in an open position relative to the ports 60, in accordance with this invention, an interlocking mechanism is provided, operating between the clamping mechanism and the male valve member. Such interlocking mechanism not only prevents uncoupling of the casing when the valve members are disposed in other than a closed position, but, if desired, will also prevent accidental or unintentional movement of the male valve member relative to the fixed casing 14 while its casing is uncoupled.

While the interlocking mechanism is shown in the drawings as applied to each of the clamping mechanisms, it will be equally effective if applied to only one of the clamping mechanisms. In each of the projecting lugs 24 provided on the fixed casing 14, a hole 25 is provided extending parallel to the hole 26 which accommodates the clamp bolt 30 and underlying the head portion 32 of such clamp bolt. The bottom end of the hole 25 is provided with a counterbore 27. A detent 29 is slidably mounted in the hole 25, having a shank portion cooperating with the hole 25 and a large head portion cooperating with the counterbore 27. A suitable spring 31 operates between the base of counterbore 27 and the head of detent 29 to urge the detent outwardly into engagement with the overlying head portion 32 of the clamp mounting bolt 30. The shank of the detent is disposed adjacent the periphery of the rotatable male valve member 104. A locking hole 33 is provided in the male valve member 104 in position to be engaged by the shank of detent 29 when the male valve member is in a fully closed position relative to the ports 60.

A cam slot 35 is provided in the head portion 32 of the clamp mounting bolt 30, and this cam slot is arranged to permit the detent 29 to project out of the counterbore 27 only when the clamp 40, and hence the clamp mounting bolt 30, are rotated to their clamping position relative to fixed casing 14. A similar interlocking mechanism is provided in association with each of the other clamps 40. It should be noted that the length of detent 29 is such that at all times it must lie either in cam slot 35 or in locking hole 33, thus insuring positive interlock action.

The operation of the interlocking mechanism is as follows. When the casings 14 and 16 are clamped together by the clamp 40, the spring 31 urges the detent 29 outwardly relative to the counterbore 27, the head of the detent 29 extending into the slot 35 in the head portion 32 of the clamp mounting bolt 30. Thus, the shank end of the detent 29 is withdrawn from the hole 33 in the rotatable male valve member 104. The male valve member, and of course the female valve member as well, may be manually rotated by the operating arm 110 without interference from the interlocking mechanism. Accordingly, the valve members may be rotated to open a desired amount of fluid flow through the coupled casing. In any position of the rotative disk-like valve members other than the fully closed position, the shank end of the detent 29 is overlaid by a solid portion of the periphery of the male valve member 104. Accordingly, if an attempt is made to rotate the clamp 40 in either direction toward an unclamping position relative to the casing, the engagement of either end of the cam slot 35 with the head of the detent 29 prevents such rotation, for any and all retracting movement of the detent 29 into the hole 25 is prevented by the engagement of its shank end with the imperforate periphery of the male valve member 104. It is therefore necessary to return the male valve member 104 to its fully closed position, at which position the hole 33 in the periphery of the male valve member aligns with the shank end of the detent 29. Thereupon rotation of the clamp 40 toward its unclamping position brings an inclined surface 37 at the end of the cam slot 35 into engagement with the head of the detent 29 and cams the detent 29 into the counterbore 27 against the bias of the spring 31. Thus when the clamp 40 has been fully rotated to its unclamped position the shank end of detent 29 is held in its inserted relation in the hole 33 in the male valve member 104 and the head of the detent is resting against the base of the head portion 32 of the clamping bolt 30. The movable casing 16 may then be removed from association with the fixed casing 14.

In the uncoupled position of the fixed casing 14 it will be noted that the male valve member 104 is securely held by the detent 29 against any accidental rotation. However, if it is desired to rotate the male valve member 104 in the uncoupled position of the fixed casing 14 for cleaning or draining purposes, then it is only necessary to rotate the clamp bolt 30 to its clamping position relative to the fixed casing 14. Such movement will immediately align the slot 35 with the head of the detent 29, permitting the detent to snap out of the hole 33 in the male valve member 104 under the bias of the spring 31.

It should be noted that the sealing arrangements heretofore described are particularly efficient in preventing leakage during rotation of the valve disks. The port seals 68 prevent leakage between the valve disks in either the open or closed positions of such disks and the seal 130 prevents such leakage in all positions of the valve disks including positions intermediate the open and closed.

It is therefore apparent that the described structure provides a quick disconnect coupling particularly adapted for use between large capacity conduits. The coupling constructed in accordance with this invention is characterized by simplicity of its components and reliability of its operation. The amount of fluid lost by leakage during coupling and uncoupling operation is substantially reduced over prior art constructions and the forces required for its operation are so small as to permit convenient manual operation of the couplings. Furthermore, a device constructed in accordance with this invention provides a reliable automatic interlocking of the coupling mechanism with the valve mechanism, preventing accidental displacement of the valve mechanism when the casings are in uncoupled relationship and preventing accidental or unintentional uncoupling of the cooperating casings when the valve mechanism is in a position permitting fluid flow through the couplings.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. A coupling comprising a pair of complementary parts, each having a port therein for fluid flow therethrough, means for detachably coupling said parts together with said ports in spaced relationship, and a disk-like valve mounted intermediate said ports in the coupled position of said parts and rotatable about the disk axis after said parts are coupled between an opening and a sealing relationship with said ports.

2. A coupling comprising a pair of complementary parts, each having a port therein for fluid flow therethrough, means for detachably coupling said parts together with said ports in spaced relationship, a multi-piece disk-like valve member located intermediate said ports in the coupled position of said parts and rotatable about the disk axis between an opening and a sealing relationship with said ports after said parts are coupled, one piece of said valve being secured to one of said parts and another piece of said valve being secured to the other of said parts, each of said valve pieces being arranged to seal the port of its respective part in either the coupled or uncoupled relation of said parts.

3. A coupling comprising a pair of complementary parts, each having a port therein for fluid flow therethrough, means for detachably coupling said parts together with said ports in opposed alignment, a multi-piece disk-like valve member located intermediate said ports in the coupled position of said parts and rotatable about the disk axis between an open and a closed relationship with said ports, one piece of said valve being rotatably secured to one of said parts and another piece of said valve being rotatably secured to the other of said parts, each of said valve pieces having a rotative position arranged to seal the respective port of its respective part in either the coupled or uncoupled relation of said parts, means for manually rotating said valve member and means associated with one of said parts for preventing rotation of the said respective valve piece when said parts are uncoupled and for preventing uncoupling operation of said coupling means except when the said respective valve piece is in its said closed position relative to its respective port.

4. A coupling comprising a pair of complementary parts, each having a port therein for fluid flow therethrough, means for detachably coupling said parts together with said ports in opposed alignment, a multi-piece disk-like valve located intermediate said ports in the coupled position of said parts and rotatable about the disk axis between an opening and a sealing relationship of said ports, one piece of said valve being rotatably secured to one of said parts and another piece of said valve being rotatably secured to the other of said parts, each of said valve pieces having a rotative position arranged to seal the respective port of its respective part in either the coupled or uncoupled position of said parts, means for connecting said valve pieces together for co-rotation only in the coupled position of said parts, means projecting exteriorly of one of said parts for rotating the respective valve piece secured to said one part, and means cooperating with said coupling means for preventing rotation of said valve piece when said parts are uncoupled and for preventing uncoupling operation of said coupling means when said valve member is rotated to its open position relative to said port.

5. A coupling comprising a pair of complementary parts, each having a port therein for fluid flow therethrough, means for detachably coupling said parts together with said ports in spaced relationship, a multi-piece disk-like valve located intermediate said ports in the coupled position of said parts and rotatable about the disk axis between an opening and a sealing relationship with said ports, one piece of said valve being rotatably secured to one of said parts and another piece of said valve being rotatably secured to the other of said parts, each of said valve pieces having a rotative position arranged to seal the respective port of its respective part in the coupled or uncoupled relation of said parts, means for manually rotating said valve, and interlock means cooperating between one of said valve pieces and said coupling means for preventing rotation of said one valve piece when said parts are uncoupled and for preventing uncoupling operation of said coupling means when said one valve piece is in a non-sealing position relative to its said respective port.

6. A coupling comprising a pair of complementary casings, each having a port therein for fluid flow therethrough, means for detachably coupling said casings together with said ports in alignment, a pair of disk-like valve members having an aperture therein, means for rotatably mounting said valve members respectively on said casing for rotation about the disk axis, both of said valve members being disposed intermediate said ports in the coupled position of said casings, means for connecting said valve members together for co-rotation only in the coupled position of said casings, said valve members being rotatable in the coupled position of said casings to and from a position of alignment of said apertures with said ports, thereby controlling the flow of fluid through said casings, each of said valve members being positionable in sealing relation to the port of its respective casing when said casings are uncoupled, an operating arm on one of said valve members projecting exteriorly of its respective casing to provide means for rotating said one valve member, and spring pressed detent means associated with one of said casings for preventing rotation of said one valve member when said casings are uncoupled and for preventing uncoupling operation of said coupling means when said one valve member is in its open position relative to its respective port.

7. A coupling comprising a pair of complementary hollow casings, each of said casings having a web extending across one end defining a port for fluid flow therethrough, a pair of disk-like valve members, each having an eccentric aperture therein, means including pins mounted in said webs for rotatably mounting said valve members respectively in said casings adjacent said webs for rotation about the disk axis and overlying said port openings in sealing relation thereto, clamp means for detachably coupling said casings together with the openings of said ports disposed in opposed alignment, and said valve members abutting in coaxial relation, and means for rotating said valve members in the coupled position of said casings to align or misalign said apertures with said port openings, thereby controlling fluid flow through said casings.

8. A coupling comprising a pair of complementary hollow casings, each of said casings having a web extending across one end defining a port for fluid flow therethrough, a pair of disk-like valve members, each having an eccentric aperture therein, means including pins mounted in said webs for rotatably mounting said valve members respectively in said casings adjacent said webs for rotation about the disk axis and overlying said port openings in sealing relation thereto, clamp means for detachably coupling said casings together with the openings of said ports disposed in opposed alignment and said valve members abutting in coaxial relation, means for rotating said valve members in the coupled position of said casings to align or misalign said apertures with said port openings, thereby controlling fluid flow through said casings, and interlocking means communicating between one of said valve members and said coupling means for preventing rotation of said one valve member when said casings are uncoupled and for preventing uncoupling operation of said coupling means when said one valve member is in a non-sealing position relative to its respective port.

9. A coupling comprising a pair of complementary hollow casings, each of said casings having a web extending across one end defining a port for fluid flow therethrough, a pair of disk-like valve members, each having an eccentric aperture therein, means including pins centrally mounted in said webs for rotatably mounting said valve members respectively in said casings adjacent said webs for rotation about the disk axis and overlying said port openings in sealing relation thereto, clamp means for detachably coupling said casings together with the openings of said ports disposed in opposed alignment and said valve members abutting in coaxial relation, an annular bushing disposed in one of said valve apertures and engageable in said other valve aperture in the coupled position of said casings, thereby securing said valve members for co-rotation, and an arm integrally formed on one of said valve members projecting exteriorly of said casing to facilitate manual rotation of said valve members.

10. A coupling comprising a pair of complementary axially symmetrical casings, each of said casings having a web extending across one defining an eccentrically disposed port for fluid flow therethrough, clamp means for detachably coupling said casings together in coaxial relationship and with the openings of said ports disposed in opposed alignment, a pair of disk-like valve members, each having an eccentric aperture therein, means including pins axially mounted in said webs for rotatably mounting said valve members respectively in said casings for coaxial rotation about the disk axis and overlying said port openings in sealing relation thereto, said valve members abutting in the coupled position of said casings, an annular bushing disposed in one of said valve apertures and engageable in said other valve aperture in the coupled position of said casing, thereby securing said valve members for co-rotation, an arm integrally formed on one of said valve members projecting exteriorly of said casing to facilitate manual rotation of said valve members, and a spring pressed detent disposed between said clamping means and said arm-carrying valve member in interlocking relationship thereto for preventing rotation of such valve member when said casings are uncoupled and for preventing uncoupling operation of said clamp means when said valve member is disposed with its aperture aligned with said port opening.

11. A coupling comprising a pair of complementary casings having ports therein for fluid flow therethrough, means for detachably coupling said casings together, a valve member mounted in one of said casings for movement between two distinct positions relative to said ports, and interlocking means cooperating between said coupling means and said valve member for preventing uncoupling operation of said coupling means when said valve member is disposed in one of said positions, but permitting uncoupling operation of said coupling means when said valve member is disposed in said other position.

12. A coupling comprising a pair of complementary casings having ports therein for fluid flow therethrough, a clamp rotatably mounted on one of said casings, said clamp being constructed and arranged to engage the other of said casings in clamping relation in a first rotative position and to disengage said other casing in a second rotative position, a valve member mounted in one of said casings for rotation between two distinct controlling positions relative to said ports, and an interlocking plunger operating between said clamp and said valve member, means on said clamp member for receiving said plunger in locking relation when said clamp member is in its said engaging position, cam means on said clamp member for moving said plunger out of said locking relation by rotation of said clamp member to its said disengaging position, and means on said valve member for preventing said movement of said plunger except when said valve member is in said first rotative position.

13. A coupling comprising a pair of complementary casings having ports therein for fluid flow therethrough, a clamp rotatably mounted in one of said casings, said clamp being constructed and arranged to engage the other of said casings in clamping relation in a first rotative position and to disengage said other casing in a second rotative position, a disk-like valve member mounted in one of said casings for rotation about the disk axis between an open and a closed position relative to said ports, and an interlocking plunger movably mounted in said one casing between said clamp and said valve member, said valve member having an opening therein arranged to receive one end of said plunger in locking relation in said closed position of said valve, said clamp having a recess arranged to receive the other end of said plunger in locking relation in the said engaging position of said clamp, the length of said plunger being selected to maintain said plunger at all times in engagement with either said opening or said recess, thereby preventing rotation of said clamp to its said disengaging position when said valve member is rotated out of its closed position and preventing rotation of said valve member from its said closed position when said clamp is in its said disengaging position.

14. A coupling comprising a pair of complementary hollow casings, each of said casings having a web extending across one end defining an eccentrically disposed port for fluid flow therethrough, a clamp for detachably coupling said casings together with said ports disposed in opposed alignment, said clamp being rotatably mounted on one of said casings and constructed and arranged to engage the other of said casings in clamping relation in a first rotative position to couple said casings and to disengage said other casing in a second rotative position, a pair of disk-like valve members, each having an eccentric aperture therein, means including pins axially mounted in said webs for mounting said valve members respectively in said casings in coaxial relation for rotation about the disk axis and respectively overlying said ports in sealing relation thereto, said valve members abutting in the coupled position of said casings, an annular bushing disposed in one of said valve apertures and engageable in said other valve aperture in the coupled position of said casings, thereby securing said valve members for corotation, an arm integrally formed on one of said valve members projecting exteriorly of said casing to facilitate manual rotation of said valve members between an open and a closed position relative to said port, an interlocking plunger movably mounted in said one casing between said clamp and said one valve member, said one valve member having an opening therein arranged to receive one end of said plunger in locking relation in the said closed position of said one valve member, said clamp having a recess arranged to receive the other end of said plunger in locking relation in the said coupling position of said clamp, the length of said plunger being selected to maintain said plunger at all times in engagement with either said opening or said recess, thereby preventing rotation of said clamp to said disengaging position when said valve member is rotated to a position other than its said closed position and preventing rotation of said valve member from its said closed position when said clamp is disposed in its said disengaging position.

15. In a fluid control device of the class described, a pair of complementary casings each having a port therethrough and an apertured disk-like valve member rotatable in each casing about the disk axis between an open and sealing relation with said port, fluid sealing means surrounding each of said ports and cooperating with the respective valve member to prevent fluid leakage between said ports and said valves in either the open or sealing position of said valves, means for coupling said casings together with said valves lying in abutting coaxial relation, and an annular seal operating between said valve members to prevent fluid leakage therebetween in positions of said valve members intermediate said open and sealing positions.

16. In combination with a cylindrical conduit having a counterbored end opening, a fluid seal adapted to engage an intersecting surface movable transversely relative to the conduit comprising an annular band of resilient fluid sealing material insertable in said counterbore with an end face thereof adjacent the end of the conduit and shaped to conform to the intersecting surface, an outwardly projecting radial flange on the inserted end of said band, a securing ring secured in said counterbore in overlying relationship to said outwardly projecting flange thereby securing said band in said counterbore, and resilient means for urging said one end face of said band axially into sealing engagement with the intersecting surface by stressing the resilient material of said band.

17. A fluid seal for use at the juncture of a cylindrical conduit and an intersecting planar surface movable in its own plane relative to the conduit comprising an annular band of flexible, fluid sealing material disposed about the periphery of the conduit and having one planar end face thereof adjacent and parallel to the planar surface and the other end face relatively remote from the planar surface in the direction of the conduit, an annular supporting member engageable with said band adjacent said remote end face, said supporting member being constructed and arranged to fixedly position said remote end portion of said band relative to the conduit, thereby permitting axial movement of said adjacent end face only by stressing of the flexible material between said adjacent end face and said annular supporting member, and resilient means for urging said adjacent end face axially into abutting engagement with the planar surface, thereby preventing fluid loss between the conduit and the planar surface.

18. A fluid seal for use at the juncture of a cylindrical conduit and an intersecting planar surface movable in its own plane relative to the conduit, comprising an annular band of flexible fluid sealing material disposed about the periphery of the conduit and having one planar end face thereof adjacent and parallel to the planar surface and the other end face relatively remote from the planar surface in the direction of the conduit, an annular flange on the remote end of said band, a supporting ring fixedly mounted in the conduit and engaging said flange in securing relation to prevent axial movement of the remote end of said band, a radially projecting flange on said adjacent end of said band, and a spring seating on said radially projecting flange and exerting an axial bias on said band, urging said adjacent end face thereof into abutting sealing engagement with the planar surface by stressing the resilient material of said band.

19. In combination with a cylindrical conduit having a counterbored end opening, a fluid seal adapted to engage a planar surface intersecting said end opening comprising an annular band of resilient fluid-sealing material loosely insertable in said counterbore with one end face thereof adjacent the end of said conduit, an outwardly projecting radial flange on the inserted end of said band engaging the wall of said counterbore, a securing ring secured in said counterbore in overlying relationship to said outwardly projecting flange and securing said flange in sealing relationship to the base of said counterbore, an inwardly projecting radial flange on the said adjacent end of said band, and a helical spring insertable in said conduit and engaging said inwardly projecting flange to bias said adjacent end face of said band axially into sealing engagement with the planar surface by stressing the resilient material of said band.

20. In a fluid control device of the class described, a first casing having a first disk-like valve member rotatable about the disk axis, a second casing having a second disk-like valve member coaxially rotatably mounted and abutting with said first valve member, an annular sealing member arranged to prevent fluid leakage between the periphery of said first valve member and said first casing, said sealing member having an annular rib projecting outwardly beyond the abutting face of said first valve member, and said second valve member having an annular groove therein for receiving said annular rib in sealing relation to prevent fluid leakage between said first and second valve members.

21. In a fluid control device of the class described, a pair of complementary casings each having a port therethrough and an apertured disk-like valve member rotatable in each casing about the disk axis between an open and sealing relation with said port, fluid sealing means surrounding each of said ports and cooperating with the respective valve member to prevent fluid leakage between said ports and said valves in either the open or sealing position of said valves, means for coupling said casings together with said valves lying in abutting coaxial relation, an annular sealing member arranged to prevent fluid leakage between the periphery of one of said valve members and its respective casing, said sealing member having an annular rib projecting outwardly beyond the abutting face of said one valve member, and said other valve member having an annular groove therein for receiving said annular rib in sealing relation to prevent fluid leakage between said valve members in positions of said valve members intermediate said open and sealing positions.

JACOB RUSH SNYDER.

REFERENCES CITED

The following references are of record in the file of this patent:

UNITED STATES PATENTS

| Number | Name | Date |
|---|---|---|
| 2,333,496 | Townhill et al. | Nov. 2, 1943 |

FOREIGN PATENTS

| Number | Country | Date |
|---|---|---|
| 295,130 | Germany | Sept. 4, 1914 |